United States Patent [19]
Alberti

[11] 3,796,397
[45] Mar. 12, 1974

[54] CARGO CONTAINER LATCH
[75] Inventor: John Alberti, Seattle, Wash.
[73] Assignee: The Boeing Company, Seattle, Wash.
[22] Filed: July 21, 1972
[21] Appl. No.: 274,128

[52] U.S. Cl....... 244/118 R, 244/137 R, 248/119 R
[51] Int. Cl.............................................. B64c 1/20
[58] Field of Search.................. 244/118 R, 137 R; 105/369 A

[56] References Cited
UNITED STATES PATENTS
| | | | |
|---|---|---|---|
| 3,377,040 | 4/1968 | Hansen | 244/118 R X |
| 3,251,489 | 5/1966 | Davidson | 244/137 R X |
| 3,210,038 | 10/1965 | Bader et al. | 105/369 X |
| 3,262,588 | 7/1966 | Davidson | 244/137 R X |

*Primary Examiner*—Duane A. Reger
*Assistant Examiner*—Gregory W. O'Connor
*Attorney, Agent, or Firm*—H. Gus Hartmann; Glenn Orlob

[57] ABSTRACT

A retractable cargo container latch assembly for securing cargo containers or pallets to the seat-tracks in the floor of an aircraft compartment wherein the latch mechanism comprises a pair of rotatable latch arms, each having a vertical restraint lip integral therewith in combination with a spring-loaded pawl for securing the latch-head assembly in the upright extended cargo engaging position.

2 Claims, 16 Drawing Figures 3,796,397

PATENTED MAR 12 1974 3,796,397
SHEET 3 OF 3
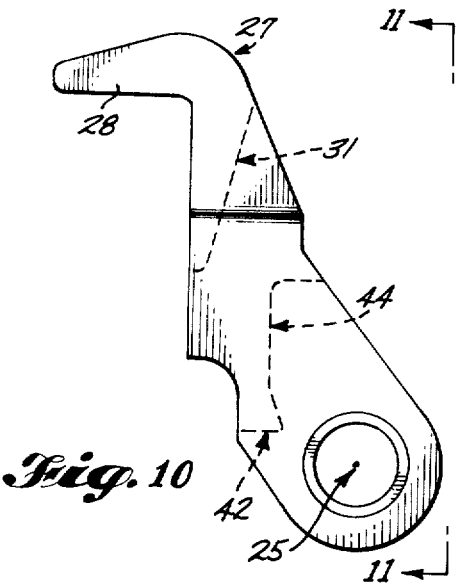
Fig. 10
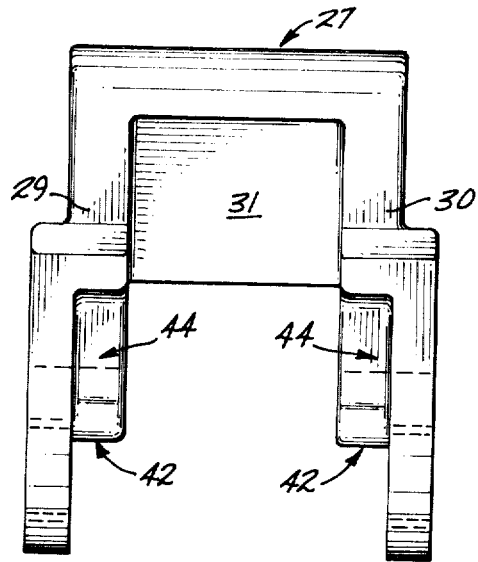
Fig. 11
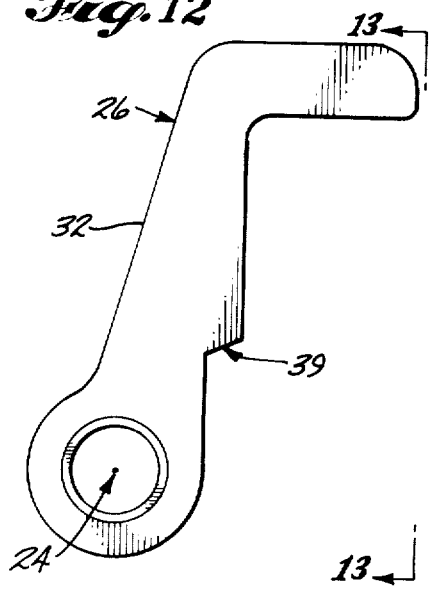
Fig. 12
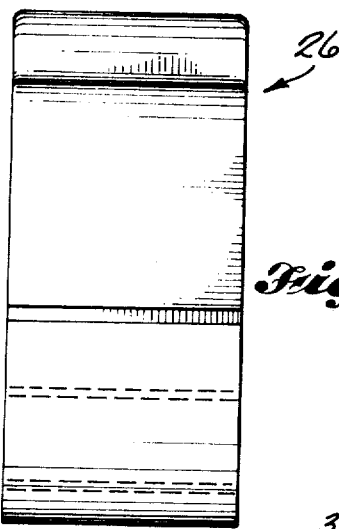
Fig. 13
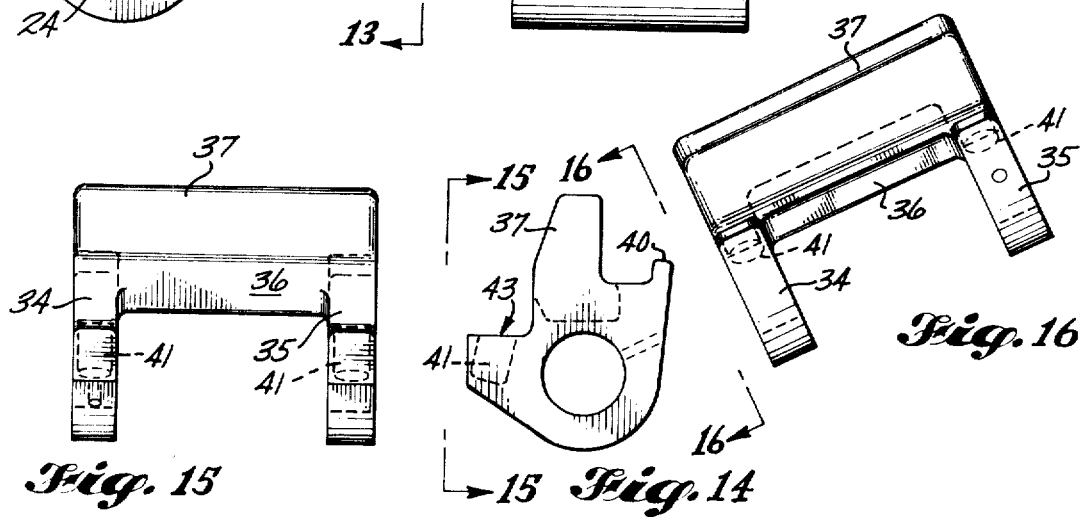
Fig. 15
Fig. 14
Fig. 16

CARGO CONTAINER LATCH

SUMMARY OF THE INVENTION

The invention relates to a cargo container or pallet latch assembly for securing the cargo loaded container pallets to the floor of an aircraft cargo storage compartment and more particularly to a simplified latch mechanism having a minimum number of parts for providing the required functions including retractability to a flush floor mounted position. The latch assembly of the present invention could be utilized in a cargo handling system such as described in my co-pending application Ser. No. 140,773, filed May 6, 1971. As more clearly described therein, during the cargo loading operation, a powered drive wheel system engages the undersurface of the cargo containers and in combination with guide devices, arranges and aligns the cargo containers into their approximate position within the storage compartment of the aircraft. As each of the cargo containers is moved into final position, the retracted latch assembly of the present invention, is raised to the upright extended position for engaging the flanged base or a pocket in the container for vertical and lateral restraint.

Rapid turn around time of an aircraft is essential to a profitable operation and the time saved, particularly in the area of cargo loading and unloading operations where a greater portion of the time savings can be realized, is of utmost importance to the utilization schedule of the aircraft. Therefore, ease and simplicity of operation of the individual components comprising the cargo handling system together with low maintenance are prerequisites to savings and the present invention with its ease of operation and simplicity in design wherein a minimum number of parts are utilized while still retaining all of the necessary functions of the more complicated mechanisms, makes it a most advantageous device for such a system.

FIG. 10 is an enlarged side view of the inner latch arm 35;

FIG. 11 is a rear view of the inner latch arm 35 taken in the direction indicated by 11—11 in FIG. 10;

FIG. 12 is an enlarged side view of the outer latch arm 34;

FIG. 13 is a front view of the outer latch arm 34 taken in the direction indicated by 13—13 in FIG. 12;

FIG. 14 is an enlarged side view of the pawl member 50;

FIG. 15 is a front view of the pawl 50 taken in the direction indicated by 15—15 in FIG. 14; and FIG. 16 is an elevated rear view of the pawl 50 taken in the direction indicated by 16—16 in FIG. 14.

DESCRIPTION OF THE PREFERRED EMBODIMENTS

The cargo container latch assembly of the present invention comprises a base or carriage that is mounted to the floor of an aircraft storage compartment and is manually adjustable in a fore and aft direction through engagement of a longitudinal seat-track or rail in the floor. It should be noted that with respect to the latch assembly illustrated in the figures, that the logical direction of loading the cargo containers into the storage compartment would be towards the left, that is from right to left and unloading towards the right due to the direction of rotation of the latch head assembly during extension or retraction.

Figure 1:
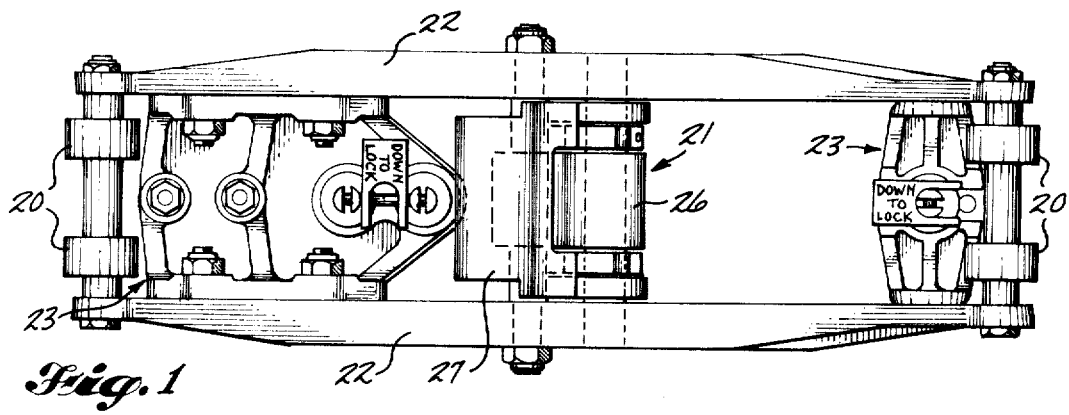
FIG. 1 is a plan view of the aircraft cargo container retractable latch assembly of this invention with the latch-head assembly shown in the upright extended position for restraining the cargo containers.
Figure 2:
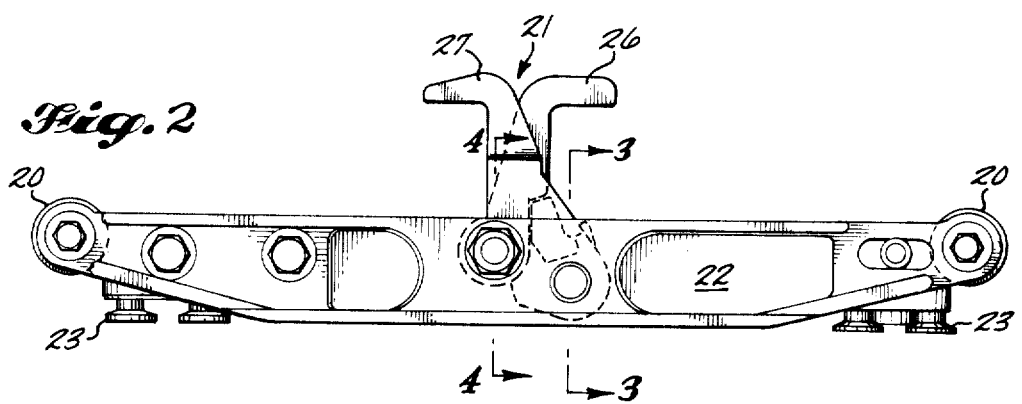
FIG. 2 is a side view of FIG. 1.
Figure 3:
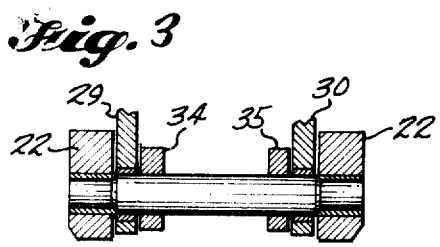
FIG. 3 is a sectional view taken along the line 3—3 in FIG. 2.
Figure 4:
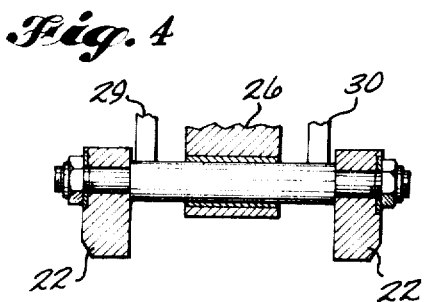
FIG. 4 is a sectional view taken along the line 4—4 in FIG. 2.
Figure 5:
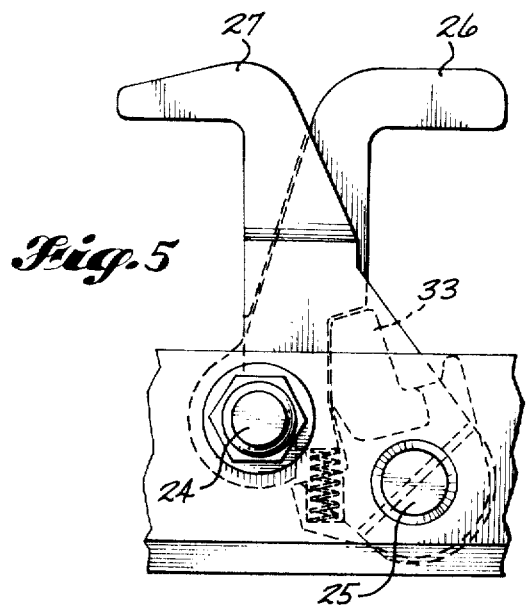
FIG. 5 is an enlarged side view of the latch-head assembly in the extended upright position similar to the showing in FIG. 2.
Figure 6:
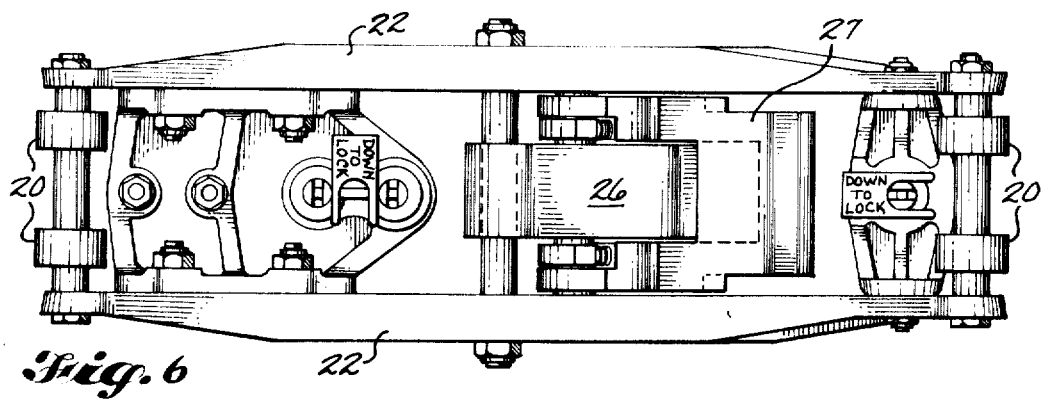
FIG. 6 is a plan view of the cargo container latch assembly with the latch-head assembly shown in the retracted position for unrestrained movement of the cargo container thereover.
Figure 7:
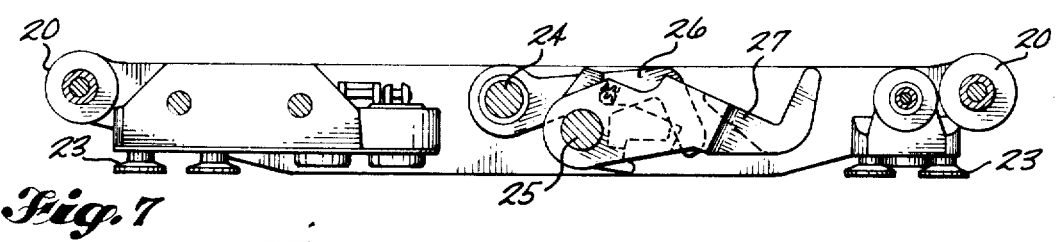
FIG. 7 is a side view of FIG. 6.
Figure 8:
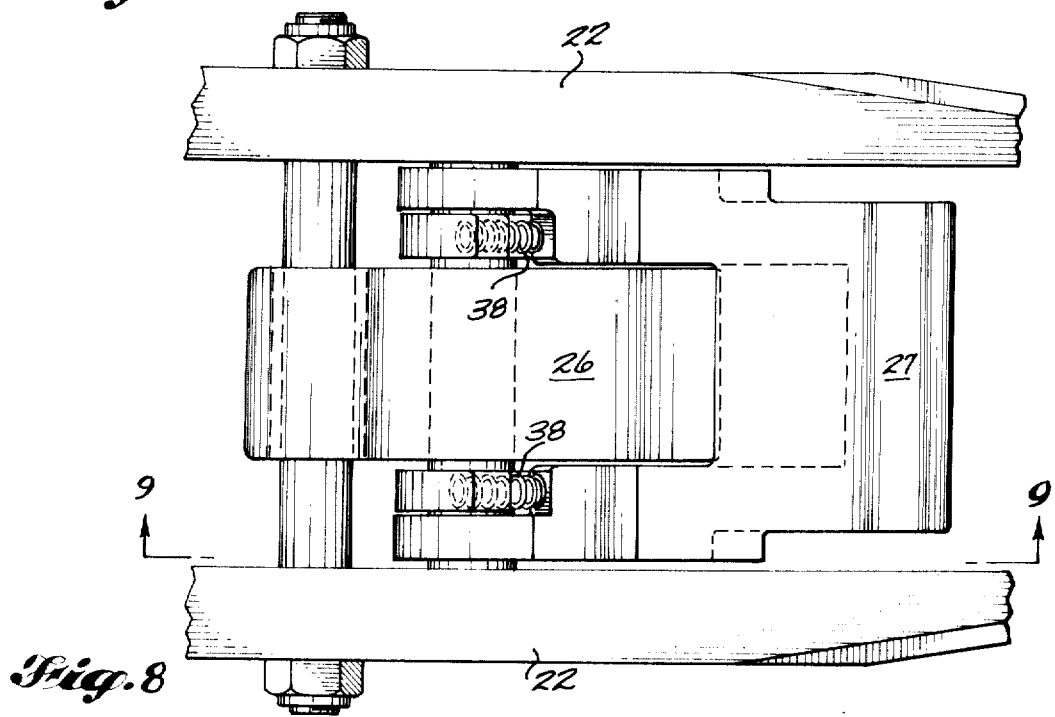
FIG. 8 is an enlarged plan view of the latch-head assembly in the retracted position similar to that depicted in FIG. 6.
Figure 9:
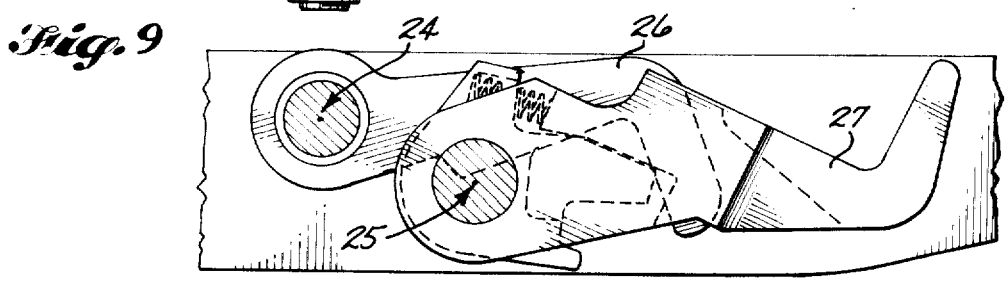
FIG. 9 is a sectional side view of the latch-head assembly taken along the line 9—9 in FIG. 8.

The carriage of the latch assembly is provided with rollers 20 at each end for engaging the undersurface of the cargo container to permit ease of movement of the container over the latch assembly when it is in the retracted position. The rollers 20 and the engaging cargo container latch head assembly 21 are rotatably mounted between the side rails 22 of the carriage. Also, mounted between the side rails 22 are the carriage to seat-track locking means or foot assembly 23 positioned towards each end of the carriage adjacent to the rollers 20. The carriage lock or foot assembly 23 secures the carriage to the track (not shown) against both lateral and vertical movement and also provides for the parallel adjustment along the track. The centrally mounted latch head assembly 21, shown in FIGS. 6–9 in the retracted position, is rotatable counterclockwise about inner axis 24 and outer axis 25 to the upright extended position shown in FIGS. 1–5 and comprises an inner latch arm 26 and an outer latch arm 27 pivotally mounted to the carriage side rails 22 for rotation about the inner and outer axes 24 and 25 respectively. The outer latch arm 27, as more clearly shown in the enlarged detail views of FIGS. 10 and 11, has a vertical restraint lip 28 for engaging a base flange or swinging into the pocket or recess in the base of a cargo container for vertical restraint thereof. The width of the outer arm 27, taken in the direction parallel to its rotational axis 24, is nonuniform in cross section as is more clearly seen in the rear view of FIG. 11 taken in the direction indicated by 11—11 in FIG. 10. Also, as shown in FIG. 11 the central portion of the arm has a cutout section wherein the inner arm 26, shown in FIGS. 12 and 13, interlays. The appearance of outer lever arm 27 is that of an inverted U-shaped or forked lever arm wherein the upper end or terminus of the arm has a lateral projection or vertical restraint lip 28. The outer lever arm 27 comprises two side arm members 29, 30, where one is the mirror image of the other, which are integrally interconnected by a central portion 31. When both the inner latch arm 26 and the outer latch arm 27 are assembled in the upright extended position shown in FIGS. 1–5, further counterclockwise movement of the inner arm 26 therefrom, is restricted by its back surface 32 contacting or abutting the outer lever arm 27 against its back surface in the central portion 31. Once the inner lever arm 26 is in its farthest position, towards the left as shown in the FIGS. 1-5, retraction or clockwise rotation from this upright extended position is restrained by a spring-loaded latching pawl 33, the enlarged details of which are more clearly shown in FIGS. 14, 15, and 16. The pawl 33 comprises two identically shaped side members 34, 35 with an integrally interconnected central portion 36. The cross sectional shape of the central portion 36 and its projection continued into the side members 34, 35, constitutes the pawl engaging projecting member 37. This member effects the interlocking of the inner and outer latch arms 26, 27 that comprise the latch head assembly as shown in the enlarged view of FIG. 5. In the latch head assembly, the pawl 33 has a central cut-out section or space between the two side members 34, 35, that permits the side members of the pawl to straddle the inner latch arm 26. The pawl 33, through a helical compression spring 38, is biased to locking the latch head assembly in the upright extended position by positioning the pawl engaging projecting member 37 into engagement with the detent 39 on the inner latch arm 26. In FIGS. 2 and 3, release of the latch head assembly is effected by manually rotating the pawl 33 clockwise with sufficient force to overcome the pressure of the springs 38 which tend to force the pawl to the left or counterclockwise. As more clearly shown in FIGS. 14-16, the pawl side members 34, 35 have an integral tail 40 which is approximately at right angles to the pawl engaging projecting member 37 and a slight thumb pressure against this tail 40 will compress the springs 38 which bear at one end against the inner side of the pawl in the spring retaining recess 41 and at the other end against the under surface of a shoulder that is on the inside of side arm members 29, 30 FIGS. 10 and 11. The pawl 33 is pivotally mounted on the same shaft as the outer latch arm 27 and is rotatable about the outer axis 25. Also, the pawl is mounted for limited rotational movement with respect to the outer latch arm 27 because the pawl side members 34, 35 are positioned to operate in the cutout section on the interior side of the side arm members 29 and 30, FIGS. 10 and 11.

In FIGS. 6-9, when the latch head assembly is in the retracted position and is to be raised to the upright extended position, because of the overlying relationship of the inner latch arm 26 over the outer latch arm 27, it is preferable to initially raise the outer latch arm 27 since its counterclockwise rotation will carry with it the inner latch arm 26 which is in an intermeshing relationship therewith. Also, as the outer latch arm 27 is raised from the retracted position, it carries with it the spring-loaded pawl 33. This can be more clearly seen from a side view of a pawl side member shown in FIG. 14 superimposed on to the side view of the outer latch arm 27 shown in FIG. 10. From this visual superimposition, it will be noted that with the axes of rotation of the pawl 33 and the outer latch arm in alignment, that the rotational movement of the pawl 33 with respect to the outer latch arm 27, is restricted within the cutout area provided on the inside surface of the outer latch arm 27. Clockwise rotation of the pawl 33 with respect to the outer latch arm 27, is limited by the abutment engagement of surfaces on each member, namely: 42 on the outer latch arm 27 and 43 on the pawl 33. Also, these two surfaces are spring biased to the spread position. Counterclockwise rotation of pawl 33, with respect to the outer latch arm 27, is limited by the pawl engaging projecting member 37 contacting surface 44 of the outer latch arm 27. The amount of relative movement between the pawl 33 and the outer latch arm 27 is determined, as shown in FIG. 12, by the depth of the detent surface 39 on the inner latch arm 26. As a result of the small amount of relative movement, the springs 38 will deflect a small amount. This configuration thus allows the use of a pair of small but effective compression springs. For lowering the latch head assembly, as previously described, the pawl 33 is rotated clockwise with respect to the outer latch arm 27 about the axis 24 until the pawl engaging projecting member 37 is clear of the detent 39 on the inner latch arm 26; at which time, both the inner and outer latch arms 26, 27, can be rotated to the down position.

What is claimed is:

1. A cargo container latch assembly for an aircraft storage compartment comprising: a carriage having a pair of parallel sides; first and second hook arms pivotally mounted between the sides for rotation about an axis transverse to the sides and with their axis of rotation parallel; said first and second hook arms being movable from a retracted and inoperative cargo restraining position to an erected cargo engaging position whereat they are in a crossed relationship with their hook portions facing in opposite directions and outwardly of each other; said first hook arm having an opening in its width taken in the direction parallel to its rotational axis through which the second hook arm passes when both hook arms are rotated to their erected position; a spring biased latching pawl connected to said first hook arm for rotation therewith and having a width taken in the direction parallel to the rotational axis of said first hook arm for spanning the opening in the first hook arm through which the second hook arm passes abutment means for limiting relative rotation of said spring biased latching pawl with respect to said first hook arm such that rotation of said first hook arm causes said pawl to engage the second hook arm for simultaneously rotating in the same direction, both hook arms from their retracted to their erected position whereat, the pawl is spring biased into a latched relationship with the second hook arm for restraining both hook arms from rotation about their respective axes.

2. A retractable cargo container latch assembly having a base that is fastened to the floor of an aircraft storage compartment, said base being manually adjustable in a fore and aft direction by locking engagement with a longitudinal track in the compartment floor, said cargo latch assembly comprising: first and second hook arms pivotally mounted to the base for rotation about an axis transverse to the longitudinal axis of the aircraft and having their hook portions facing oppositely and outwardly of each other; the second hook arm having its axis of rotation parallel to and longitudinally spaced apart from the axis of rotation of the first hook arm; the axis of rotation of each hook arm being positioned with respect to each other such that the hook arms are in a crossed relationship when rotated to an upright extended position for engaging a cargo container; said first hook arm having a central cut-out portion in its width taken in the direction parallel to its rotational axis through which the second hook arm passes when both hook arms are rotated to their erected position; a pawl pivotally mounted on the rotational axis of the first hook arm; stop means between the pawl and the first hook arm for limiting rotational movement of the pawl with respect to the first hook arm; spring means biasing said stop means such that rotation of the first hook arm substantially imparts a like rotation to the pawl; said pawl having a width taken in the direction parallel to the rotational axis of said first hook arm for spanning the central cut-out portion in the first hook arm through which the second hook arm passes such that rotation of said first hook arm from the retracted position to the erected position, causes the spring biased pawl to engage the second hook arm for rotating both hook arms together in the same direction to their erected position whereat the pawl is spring biased into a latched relationship with the second hook arm for restraining both hook arms from rotation about their respective axis.

* * * * *